April 19, 1932.     G. L. R. J. MESSIER     1,855,064
ELASTIC SHOCK ABSORBING APPARATUS
Filed March 31, 1930     2 Sheets-Sheet 1
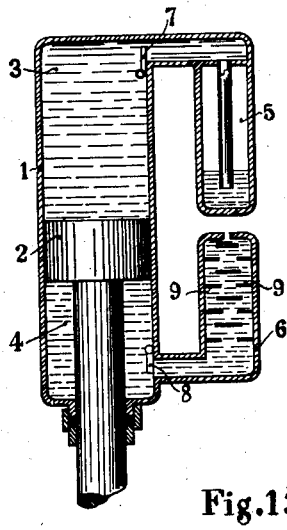
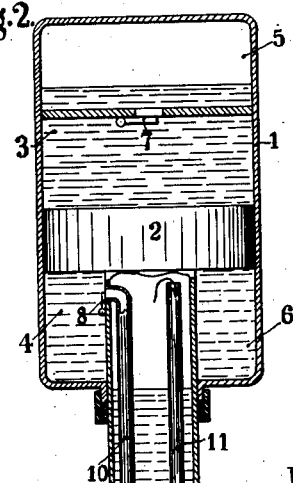
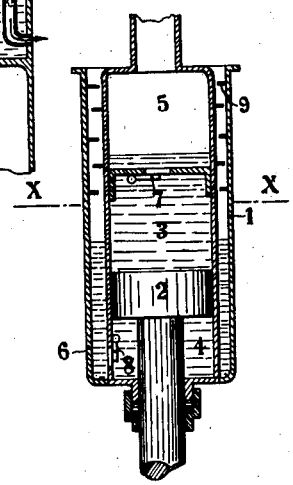
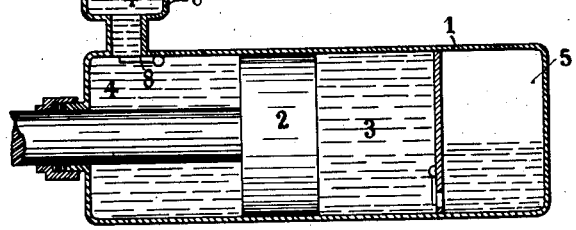
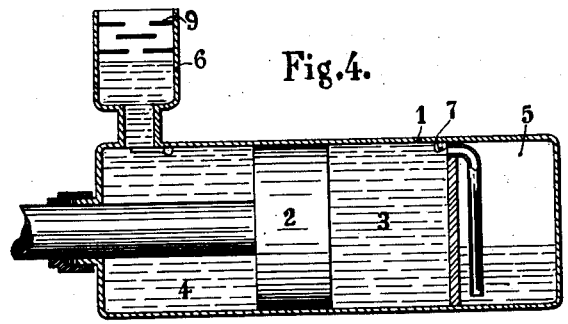
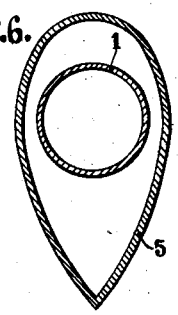

April 19, 1932. G. L. R. J. MESSIER 1,855,064
ELASTIC SHOCK ABSORBING APPARATUS
Filed March 31, 1930 2 Sheets-Sheet 2
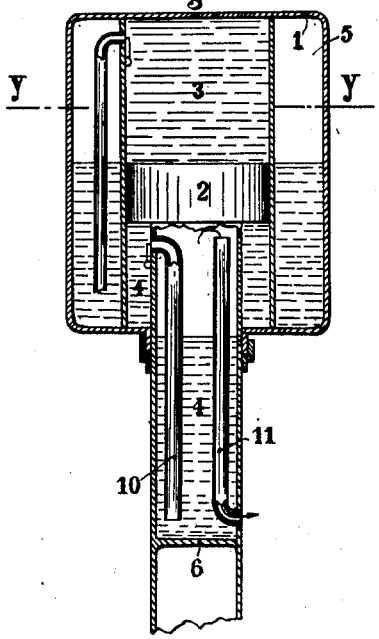
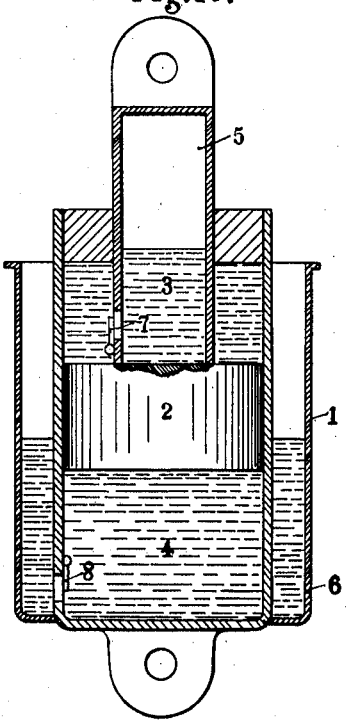
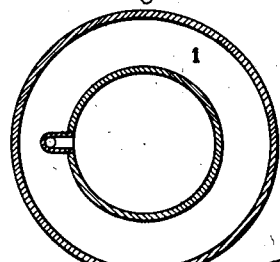
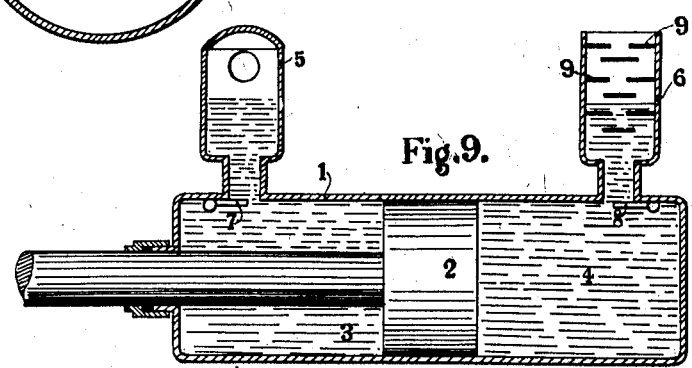
G. L. R. J. Messier
INVENTOR Patented Apr. 19, 1932

1,855,064

UNITED STATES PATENT OFFICE

GEORGE LOUIS RENÉ JEAN MESSIER, OF MONTROUGE, FRANCE

ELASTIC SHOCK ABSORBING APPARATUS

Application filed March 31, 1930, Serial No. 440,478, and in France April 8, 1929.

The invention relates to elastic shock absorbing apparatus characterized by the combination of pneumatic braking, by compressed air or other gas, with hydraulic by driving a liquid through orifices of reduced section.

Such apparatus, applied to the suspension of aeroplanes and other vehicles, has been described in the specification of United States applications filed September 8th, 1928, No. 304,433 now U. S. Patent No. 1,780,531, issued November 4, 1930, and June 13th, 1929, No. 370,622.

The oleo-pneumatic elastic shock absorbing apparatus which is the object of the present invention and which can, in particular, serve as a landing device for aeroplanes or as a shock absorber for the skids of aeroplanes, is characterized by means which allow braking by compression and braking by expansion to be obtained and particularly by the employment of a floating piston, that is to say in contact by its two faces with a suitable liquid contained in the cylinder.

One of the layers of liquid, on one side of the piston is surmounted by a cushion of compressed air.

The free surface of the other layer of liquid communicates with the outer atmosphere preferably through a ball device preventing losses of liquid when the aeroplane is inverted.

Valves arranged at convenient points of each layer only allow a narrow passage to the circulation of the liquid in one direction.

The invention provides, for this apparatus, various constructions which differ only in the positions that are occupied respectively by the space filled with compressed air and the reservoir communicating with free air.

In the accompanying drawings:

Fig. 1 shows, in longitudinal section, the shock absorber made according to the present invention.

Fig. 1ª shows a detail view of the ball apparatus.

Figs. 2 to 4, 5 and 7 show in longitudinal section various modifications in construction.

Figs. 6 and 8 are transverse sections, respectively on the lines $x$—$x$ and $y$—$y$ of Figures 5 and 7.

Figs. 9 and 10 show, in longitudinal section, apparatus to be used for traction purposes by the application of the same principle.

In all the figures of the drawings:

1 indicates the cylinder in which moves the piston 2, in two layers of liquid 3 and 4. The space filled with compressed air is marked 5 and the reservoir communicating with free air is shown at 6.

Between the layer of liquid 3 and the space 5, is placed a valve 7, which causes the braking at the time of compression.

In the layer of liquid 4, a valve 8 is provided, which acts for the braking at the time of expansion.

According to the direction of movement of the piston, one or the other of these valves only offers a restricted passage to the circulation of the liquid, which produces the desired braking effect.

In Fig. 1, the space 5 and the reservoir 6, are situated on the exterior of the main cylinder 1. The reservoir is provided with baffle plates 9, in that part where it communicates with free air, so as to avoid the projection of liquid to the exterior at the time of expansion.

In Fig. 2, the space 5, is situated in the main cylinder and the reservoir 6 is formed in the interior of the piston rod.

In this apparatus, the tube 10 leads the expansion liquid to the lower part of the reservoir 6, whilst a tube 11 permits the escapement of air as the reservoir is filled.

Figs. 3 and 4 show the cylinders arranged horizontally in which the space 5 is in the interior of the cylinders, whilst the reservoir, with its baffle plates 9 is exterior.

When one of the reservoirs is concentric to the main cylinder, it may be advantageous to point the apparatus in order to diminish its resistance to the air, in the case of its application to aeroplanes.

An example of such a construction is given in Figs. 5 and 6 in which the space 5 is contained in the main cylinder 1, whilst the expansion reservoir 6 surrounds the said cylinder.

Figs. 7 and 8 show a modification in which the space 5 filled with compressed air surrounds in circular form the main cylinder. The expansion reservoir is constituted by the piston rod and two tubes, 10 and 11, are provided as in the construction shown in Fig. 2, to lead the liquid to the lower part of the reservoir and in order to allow the escape of air at the time of expansion.

When the apparatus is intended to be used for traction purposes, the arrangement of the layers of liquid 3 and 4 is the reverse of the preceding arrangements. An example of this construction is given in Fig. 10 in which the space 5 filled with compressed air is formed in the piston rod 2 and surmounts the layer of liquid 3, the circulation of which is retarded, in one direction by the valve 7. The other layer of liquid 4 communicates with the reservoir 6 which is outside the main cylinder 1.

In the modification shown in Fig. 9, the space 5 and the reservoir 6 are both outside the main cylinder.

I claim:—

1. A shock absorber comprising a liquid containing cylinder, a chamber containing compressed gas communicating with one end of the cylinder, a reservoir communicating with the other end of the cylinder, a piston reciprocable in the cylinder and dividing the liquid therein into independent layers, one layer being cushioned by the gas in said chamber when the piston moves in one direction, the other layer being movable in the reservoir when the piston moves in a reverse direction, said reservoir being open to the atmosphere.

2. A shock absorber comprising a liquid containing cylinder, a chamber containing compressed air communicating with one end of the cylinder, a reservoir communicating with the other end of the cylinder and open to the atmosphere, a piston reciprocable in the cylinder and dividing the liquid into independent layers, and valves in the cylinder restricting the passage of the fluid of the respective layers into the chamber and reservoir during reciprocation of the piston.

3. A shock absorber comprising a liquid containing cylinder, a chamber containing compressed gas communicating at one end of the cylinder, a reservoir communicating at the other end of the cylinder and open to the atmosphere, a piston reciprocable in the cylinder dividing the liquid therein into independent layers, the respective layers being alternately forced into said chamber and reservoir, and valves carried by the cylinder for restricting the passage of the liquid layers into the chamber and reservoir and permitting the free passage thereof from the same into the cylinder.

4. A shock absorber comprising a liquid containing cylinder, a piston reciprocable in the cylinder and including a rod, the liquid in the cylinder being in contact with the opposite faces of the piston, a chamber containing compressed air communicating with one end of the cylinder, a reservoir in said rod, a tube connecting the cylinder at one side of the piston with the reservoir, and valves restricting the flow of fluid from the cylinder into the chamber and reservoir.

5. A shock absorber containing a liquid containing cylinder, a piston reciprocable in the cylinder including a rod, the liquid in the cylinder being in contact with both faces of the piston, and a chamber surrounding the cylinder, said chamber having compressed gas therein, a reservoir in the piston rod, a tube leading the liquid from the cylinder to the lower part of the reservoir, a second tube carried by the rod and opening to the atmosphere, and means for regulating the flow of liquid to and from the reservoir and chamber.

6. A shock absorber comprising a liquid containing cylinder, a piston reciprocable in the cylinder, the liquid in said cylinder being in contact with both faces of the piston, a rod for the piston having a space therein and containing a layer of liquid, a communication between said layer and the liquid on one face of the piston, said space having compressed air therein, a reservoir outside the cylinder and communicating with the liquid on the other face of the piston, said reservoir being open to the atmosphere, and valves carried by the piston and cylinder, as and for the purpose set forth.

The foregoing specification of my "improved elastic shock absorbing apparatus" signed by me this 17th day of March, 1930.

GEORGE LOUIS RENÉ JEAN MESSIER.